(12) United States Patent
Hill et al.

(10) Patent No.: US 11,136,808 B2
(45) Date of Patent: Oct. 5, 2021

(54) STRUCTURAL FEATURES FOR COATING

(71) Applicant: Brose Fahrzeugteile GmbH & Co. Kommanditgesellschaft, Bamberg, Bamberg (DE)

(72) Inventors: Benjamin Hill, Utica, MI (US); Silverio Graham, Lennon, MI (US); Hilmar Dohles, Itzgrund (DE)

(73) Assignee: Brose Fahrzeugteile GmbH & Co. Kommanditgesellschaft, Bamberg, Bamberg (DE)

(*) Notice: Subject to any disclaimer, the term of this patent is extended or adjusted under 35 U.S.C. 154(b) by 216 days.

(21) Appl. No.: 16/454,969

(22) Filed: Jun. 27, 2019

(65) Prior Publication Data
US 2020/0408020 A1    Dec. 31, 2020

(51) Int. Cl.
| E05F 13/02 | (2006.01) |
| E05F 11/38 | (2006.01) |
| E05B 85/02 | (2014.01) |
| B60N 2/02  | (2006.01) |

(52) U.S. Cl.
CPC ............ *E05F 11/382* (2013.01); *B60N 2/02* (2013.01); *E05B 85/02* (2013.01); *E05Y 2900/55* (2013.01)

(58) Field of Classification Search
CPC ... E05F 11/382; E05F 2011/387; E05F 11/50; B60N 2/1615; B60N 2/235; B60N 2/1655; B60N 2/1665; E05Y 2900/55; E05B 85/02; E05B 85/00; F16C 3/02; F16C 3/035; F16C 35/0635; F16C 3/14; F16C 35/063; F16C 19/44; F16C 2361/43; F16C 35/00; F16C 2226/80

USPC .......... 49/262, 265; 464/183, 141, 143, 106; 384/569, 565, 567, 568
See application file for complete search history.

(56) References Cited

U.S. PATENT DOCUMENTS

| 5,067,826 A * | 11/1991 | Lemelson | B28D 1/12 384/492 |
| 6,764,219 B2 * | 7/2004 | Doll | C23C 30/00 384/565 |
| 8,974,122 B2 * | 3/2015 | Kim | B81C 3/005 384/567 |
| 10,036,432 B2 * | 7/2018 | Hodge | F16D 41/067 |
| 2004/0245041 A1 * | 12/2004 | Fukuda | B62D 5/0466 180/444 |
| 2013/0213025 A1 * | 8/2013 | Linden | B60T 8/4031 60/327 |
| 2014/0183919 A1 * | 7/2014 | Hoffmann | B60N 2/933 297/362 |

(Continued)

*Primary Examiner* — Chi Q Nguyen
(74) *Attorney, Agent, or Firm* — Brooks Kushman P.C.

(57) ABSTRACT

A vehicle mechanism is provided. The vehicle mechanism may include a stationary member including a main portion provided with an offset surface region including a bearing-surface region having non-planar regions. The mechanism may also include a moveable member that may be configured to move with respect to the stationary member. The moveable member may include a mating-bearing-surface region that may be configured to engage the bearing-surface region of the stationary member. A coating may be provided on the main portion and the bearing-surface region. The coating on the main portion may have a first thickness and the coating on the bearing-surface region may have a second thickness. The second thickness may be least 20% greater than the first thickness.

14 Claims, 5 Drawing Sheets

(56) References Cited

U.S. PATENT DOCUMENTS

| | | | | |
|---|---|---|---|---|
| 2014/0305396 A1* | 10/2014 | Steele | ................... | F16D 41/067 |
| | | | | 123/179.25 |
| 2016/0025143 A1* | 1/2016 | Hodge | ...................... | F16C 3/02 |
| | | | | 464/183 |
| 2018/0305150 A1* | 10/2018 | Sato | ................... | G03G 21/1647 |
| 2020/0049200 A1* | 2/2020 | Zhong | ................... | F16C 35/067 |

\* cited by examiner

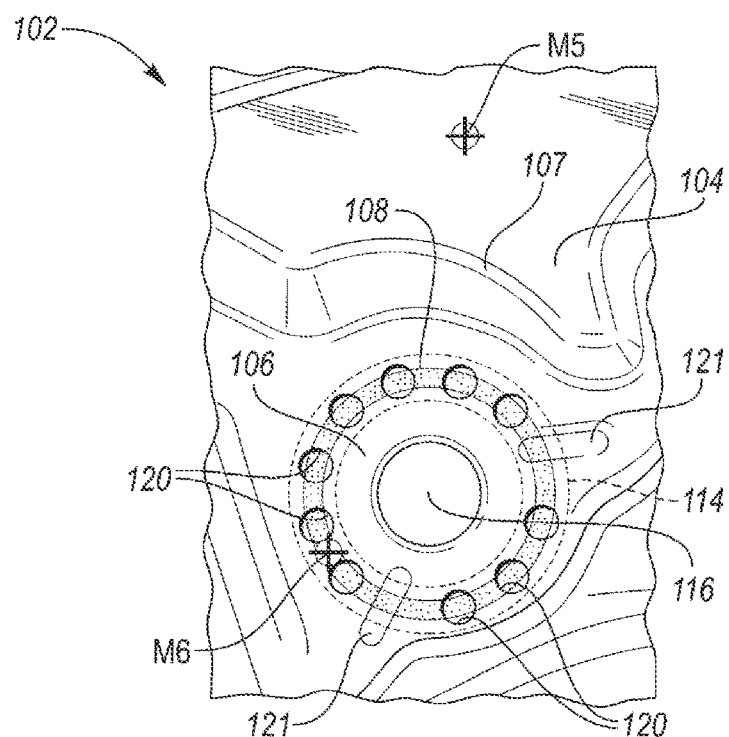
FIG. 2
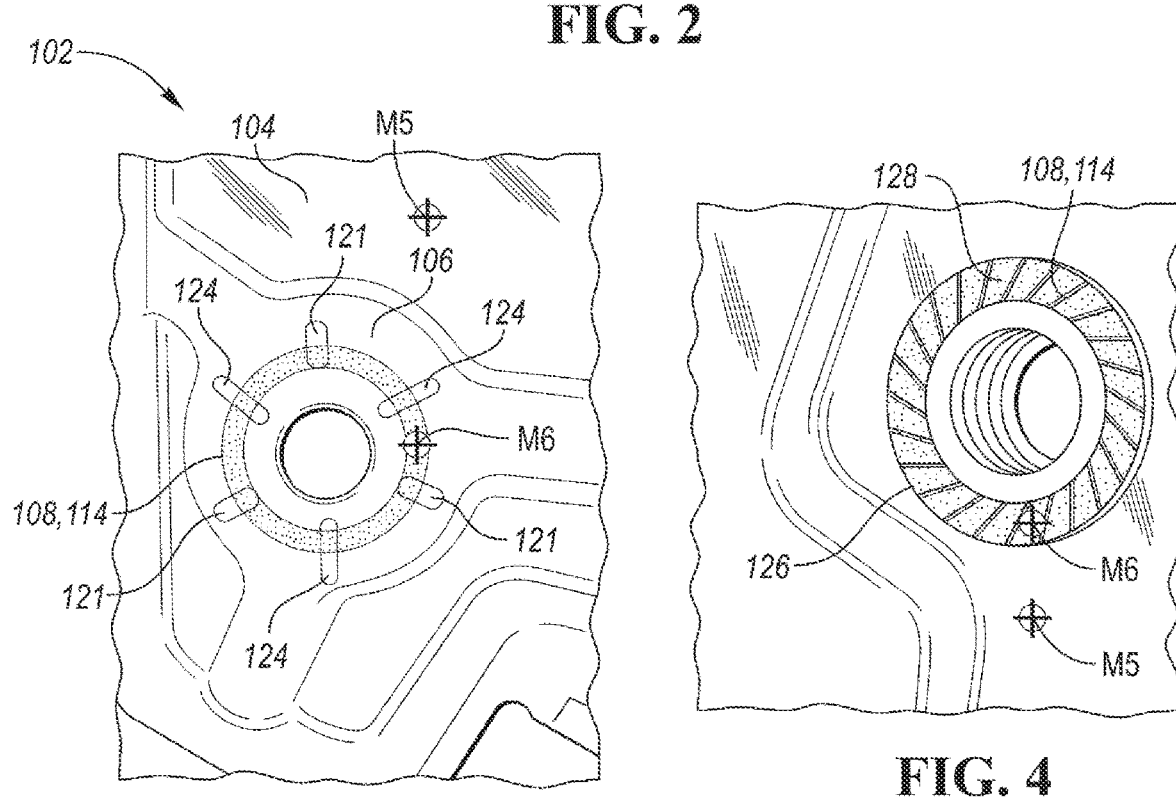
FIG. 3
FIG. 4

STRUCTURAL FEATURES FOR COATING

TECHNICAL FIELD

The present disclosure relates to structural features for various vehicle mechanisms.

BACKGROUND

Various vehicle components may include a coating that may provide a number of performance improvements. For example, the coating may inhibit corrosion, provide a finished appearance, and decrease a coefficient of friction of the component. There are various types of coatings that may be applied to vehicle components, such as electrophoretic paint or powder coating.

SUMMARY

According to one embodiment, a vehicle mechanism is provided. The vehicle mechanism may include a stationary member including a main portion provided with a surface region including a bearing-surface region having non-planar regions. The mechanism may also include a moveable member that may be configured to move with respect to the stationary member. The moveable member may include a mating-bearing-surface region that may be configured to engage the bearing-surface region of the stationary member. A coating may be provided on the main portion and the bearing-surface region. The coating on the main portion may have a first thickness and the coating on the bearing-surface region may have a second thickness. The second thickness may be least 20% greater than the first thickness.

The non-planar regions may be formed by a plurality of apertures defined by the stationary member and disposed in the bearing-surface region.

The bearing surface may be annular in shape.

The plurality of apertures may be arranged concentrically with respect to the bearing-surface region.

The non-planar regions may be formed by a plurality of depressions defined by the stationary member and disposed in the bearing-surface region.

The bearing-surface region may be circular and at least one of the depressions may be elongated and may extend in a radial direction with respect to the bearing-surface region.

The stationary member may be a guide rail for use in a window regulator and the moveable member may be a pulley.

According to another embodiment, a vehicle mechanism is provided. The vehicle mechanism may include a stationary member including a main portion, a flange extending from the main portion, and a surface region adjacent to the flange and including a bearing-surface region of the stationary member. The vehicle mechanism may also include a moveable member that may be configured to engage the bearing-surface region of the stationary member. A coating may be provided on the main portion and the bearing-surface region. The coating on the main portion may have a first thickness and the coating on the bearing-surface region may have a second thickness. The second thickness may be least 20% greater than the first thickness.

The non-planar regions may be formed by a plurality of grooves that may be defined by the stationary member and disposed in the bearing-surface region.

A first groove of the plurality of grooves may have a first depth and a second groove of the plurality of grooves may have a second depth. The second depth may be less than the first depth.

The flange may include a lip and the lip may curl towards the main portion. The lip may at least partially cover the bearing-surface region.

The stationary member may be a side panel for use in a vehicle seat assembly and the moveable member may be a link arm that may be configured to rotate about the bearing surface.

According to yet another embodiment, a vehicle mechanism is provided. The vehicle mechanism may include a stationary member that may be provided with a bearing-surface region. The vehicle mechanism may include moveable member that may be configured to move with respect to the stationary member. The moveable member may include a mating-bearing-surface region configured to engage the bearing-surface region. The mating-bearing-surface region may include non-planar regions. The moveable member may be coated with a coating. The coating on the main portion may have a first thickness and the coating on the bearing-surface region may have a second thickness. The second thickness may be least 20% greater than the first thickness.

BRIEF DESCRIPTION OF THE DRAWINGS

FIG. 2 is a partial-perspective view of an exemplary stationary member provided with non-planar regions.

FIG. 3 is a partial-perspective view of an exemplary stationary member provided with a non-planar regions.

FIG. 4 is a partial-perspective view of an exemplary stationary member provided with a non-planar regions.

DETAILED DESCRIPTION

Figure 1A:
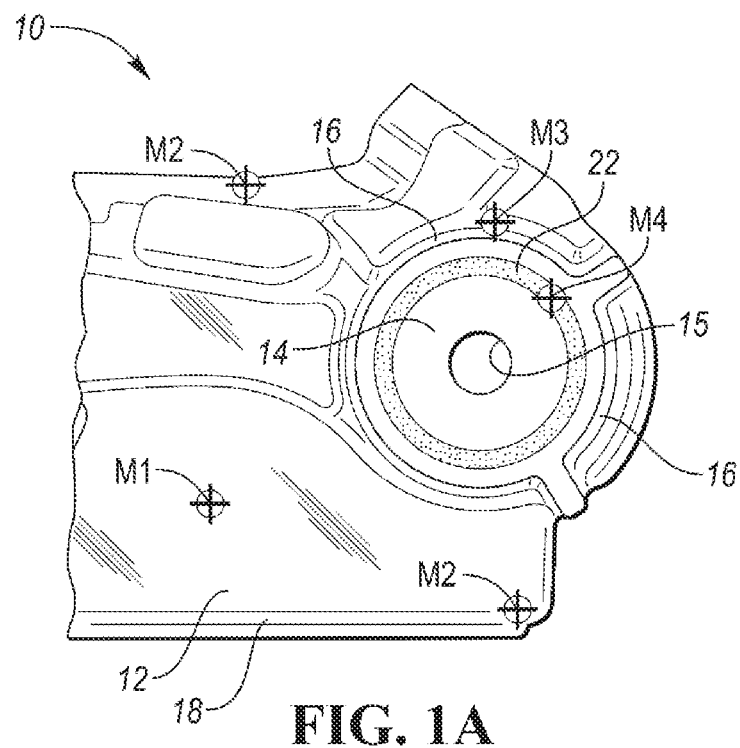
FIG. 1A is a detailed view of a portion of a first prior-art guide rail for a window regulator assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

The term "elongated" may be used herein to describe disclosed or claimed embodiments. The term "elongated" may signify that a length of an element is longer or greater than a width of the same element.

The terms "serration" or "serrated" may be used herein to describe disclosed or claimed embodiments. The terms "serration" or "serrated" a row of sharp or tooth-like projections.

Vehicle components may be coated or painted to provide a number of functional features. The coating may be applied by various manufacturing processes, including, for example, electrostatic coating. Electrostatic coating processes may include projecting paint, in the form of powdered particles or atomized liquid, towards a conductive workpiece and applying an electrostatic charge to the work piece, or sprayer mechanism, or both. Alternatively, the process may include dipping an electrically conductive workpiece into a tank of paint and then electrostatically charging the paint.

Coating vehicle components may provide certain advantages. As one example, a surface of a coated part may have a coefficient of friction that is less than a coefficient of friction of an uncoated surface. If the thickness of the coating is insufficient or less than a predetermined thickness threshold, the coating may wear over time and the coefficient of friction of the worn surface may increase. This increase in the coefficient of friction may lead to a decrease in performance, causing for example, increased efforts to actuate the vehicle component and decreased efficiency of the vehicle components.

The geometry of the vehicle component may present challenges to achieving a desired coating thickness in certain areas of the component. One solution to this challenge may be increasing the quantity of paint applied to a majority or all of the vehicle component. However, because increasing the quantity of paint may lead to an excessive coating thickness in certain areas of the vehicle component, this may not be cost effective or efficient. The present disclosure provides various attempts to resolve one or more of the above-mentioned problems.

Figure 1B:
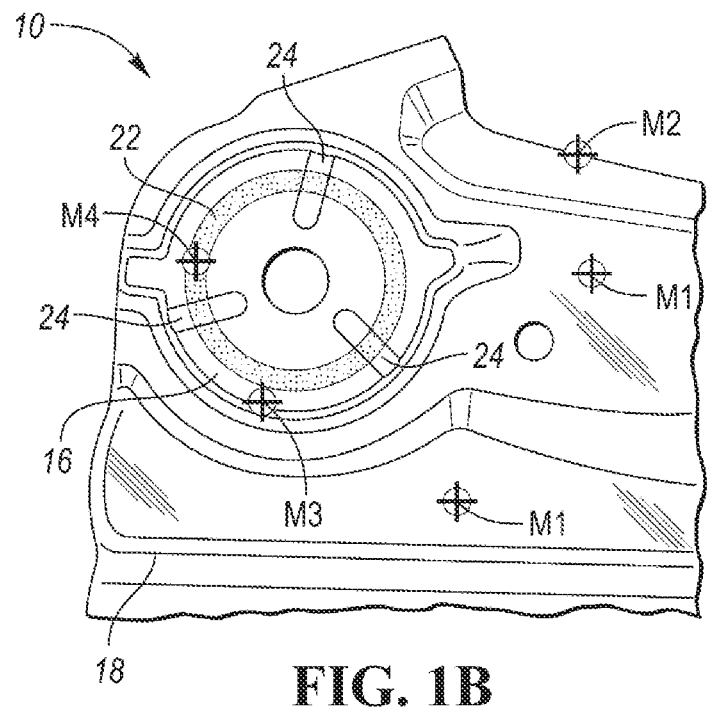
FIG. 1B is a detailed view of a portion of a second prior-art guide rail for a window regulator assembly.

Referring to FIGS. 1A and 1B, portions of an exemplary prior-art guide rail 10 for a window regulator are shown. The guide rail 10 includes a main portion 12 and a pulley mounting portion 14. The pulley mounting portion 14 may be offset e.g., raised or depressed with respect to the main portion and at least partially surrounded by rib portions 16. A periphery of the guide rail 10 may include a number of edge portions 18. The pulley mounting portion 14 may include an aperture 15 configured to receive a fastener that may rotatably mount a pulley 20 (not illustrate). The pulley mounting portion 14 may define a number of grease pockets 24 that may be configured to hold grease or other friction modifier applied to the pulley mounting portion 14. A bearing surface 22 may be included in the pulley mounting portion 14. The bearing surface 22 may be the portion of the pulley mounting portion 14 that engages the pulley 20 as the pulley rotates.

Certain areas of the prior-art guide rail 10 may have varying coating thicknesses. For example, the edge portions and the rib portions may have a thicker coating than the main portion 12. Also, the recessed areas such as the pulley mounting portion 14, may have a thinner coating than the main portion 12. The inconsistent coating thickness is due to a phenomenon that may be referred to by a person skilled in the art as the "picture-framing effect." The edge areas and portions that include radii, such as the rib portions 16, may have a higher field strength and attract a greater quantity of coating, resulting in a greater coating thickness as compared to planar portions, such as the main portion 12, and recessed portions, such as the pulley mounting portion 14.

A number of measurements points are superimposed in the on the prior-art guide rails 10. The measurement points illustrate the varying coating thicknesses along the guide rails 10. The measurements points are illustrative of the coating thickness of the area covered by the measurement point and are indicative of the coating thickness of nearby portions of the guide rails 10. The main portion 12 may have a first coating thickness, measured at a first measurement point M1, in the range of 40-120 microns. The edge portions 18 may have a second thickness, measured at the second measurement points M2, that may be greater than the first coating thickness, such as greater than 200 microns. The rib portions 16 may have a third coating thickness, measured at the third measurement points M3, similar to the second coating thickness. The pulley mounting portions 14 may have a fourth coating thickness, measured at the fourth measurement points M4, that is less than the first, second, and third coating thicknesses. For example, the fourth coating thickness of the pulley mounting portions 14 may be less than 40 microns.

Referring generally to FIG. 2 through FIG. 9, portions of vehicle mechanisms according to one or more embodiments are provided.

In one or more embodiments, the vehicle mechanism may be a window regulator 100. The window regulator may include a stationary member, such as a guide rail 102, that may include a main portion 104. The main portion 104 may be provided with an offset surface 106 that may include a bearing-surface region 108. The offset surface 106 may be depressed with respect to the main portion 104 and ribs 107. As another example, the offset surface may be raised with respect to the main portion 104 and ribs 107. The window regulator 100 includes a moveable member, such as a pulley 110 (FIG. 7), that is configured to move with respect to the guide rail 102. For example, the pulley 110 may rotate with respect to the guide rail 102. The pulley 110 may include a mating-bearing-surface region 112 (FIG. 9A) that may engage the bearing-surface region 108 of the guide rail 102.

The guide rail 102 may be coated with a coating, such as an epoxy-polyester powder, Rilsan PA11, or other suitable coatings. The main portion 104 of the guide rail 102 may have a first coating thickness, measured at measurement points M5, and the bearing-surface region 108 may have a second coating thickness, measured at measurement points M6. The bearing-surface region 108 is provided with non-planar regions 114. The non-planar regions 114 may increase the field strength of the bearing-surface region 108, as compared to region having a planar shape. Because the non-planar regions 114 have a higher field strength than a planar region, coating particles may be distributed more evenly between the main portion 104 and the non-planar regions 114 as compared to planar regions of the prior-art guide rail 10. As such, the second coating thickness may be greater than, such as more than 20% greater than the first coating thickness.

The non-planar regions 114 may be formed by various structural features described below are merely examples and are not intended to be limiting.

Referring specifically to FIG. 2, a portion of a stationary member, such as the guide rail 102, according to one or more embodiments, is provided. Here, the non-planar regions are formed by a number of apertures 120. The bearing-surface region 108 may have an annular shape and arranged concentrically with a pulley mounting aperture 116. The apertures 120 may be arranged concentrically with respect to the bearing-surface region 108. In one or more embodiments, the apertures may be uniformly distributed around the pulley mounting aperture 116. One or more of the apertures 120 may be circular but in other embodiments, they may be ellipses or tear-drop shaped. The size e.g. diameter and number of the apertures 120 may vary depending the coating thickness required in the bearing-surface region 108. In one or more embodiments, the apertures 120 may be positioned on either side of grease pockets 121 formed in the offset surface 106.

Referring specifically to FIG. 3, another example of a stationary member, such as a guide rail 102 provided with non-planar regions is provided. The guide rail 102 may include a main portion 104 and a number of ribs 107 that may at least partially surround the offset surface 106. The non-planar regions 114 may be formed by one or more grooves 124. As one example, the groove 124 may have an elongated shape and extend in a radial direction with respect to the bearing-surface region 108. As another example, the grooves 124 may be interstitially arranged with respect to the grease pockets 121.

Referring specifically to FIG. 4, another example of a stationary member, such as a fastener 126 is provided. In one or more embodiments, the fastener 126 may be a nut configured for use in the window regulator assembly 100. As one example, the nut 126 may engage another fastener, such as a bolt to fix the pulley 110 to the guide rail 102. One or more surfaces of the nut may be configured to engage the pulley 110 or the guide rail 102. One or more of the surfaces may be provided with non-planar regions 114. As one example, the non-planar regions 114 may be formed by a number of serrations 128.

Figure 5:
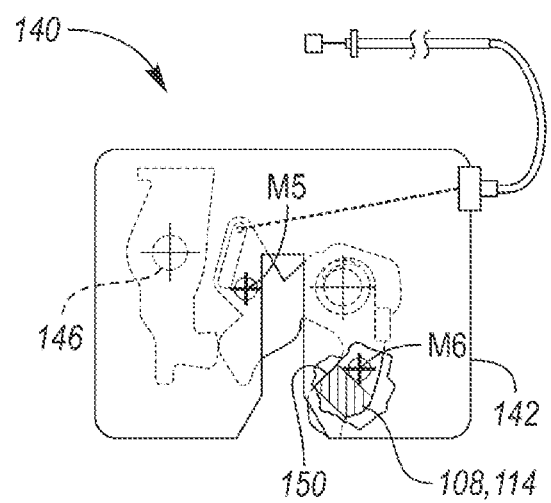
FIG. 5 is a plan view of an exemplary latch assembly.

Referring to FIG. 5, a plan view of a vehicle latch 140 is provided. The latch 140 may include a housing 142 that is provided with a catch 144 and a pawl 146. The catch 144 may be configured to rotate to engage a striker (not shown) and the pawl 146 may be configured to engage the catch 144 to prevent the catch 144 from rotating to disengage from the striker once the latch 140 is in a locked state. In one or more embodiments, a moveable member, such as the catch 144 or the pawl 146, or both may be provided with mating-bearing-surface region 112 that are configured to engage a bearing-surface region 108 defined by other components of the latch 140, such as the housing 142. The mating-bearing-surface region 112 may be provided with non-planar regions 114. The non-planar regions 114 may be formed by apertures, grooves, or serrations as described above. The non-planar regions 114 may facilitate a more uniform coating thickness as previously described above.

Figure 6:
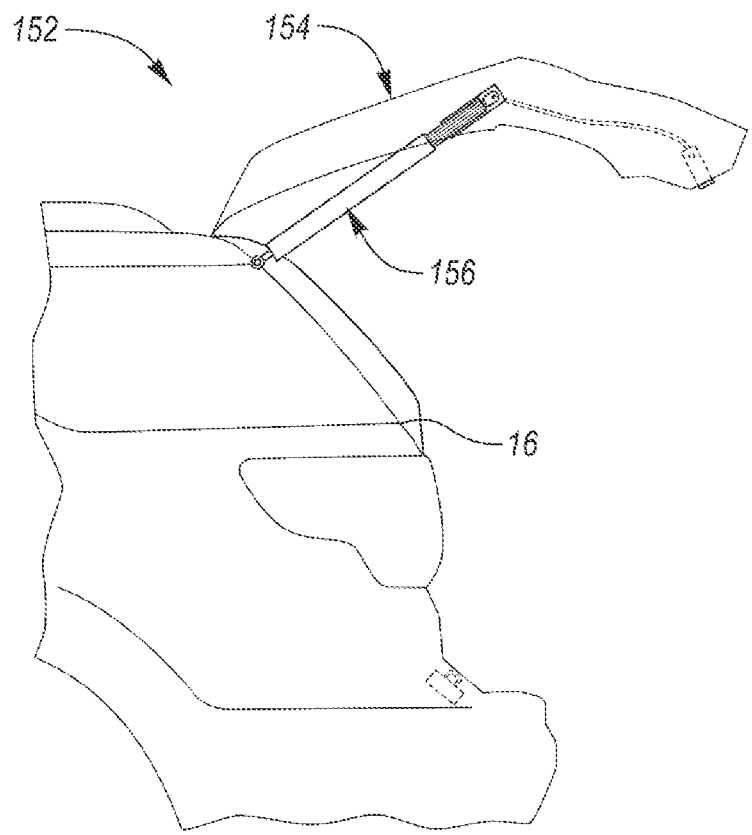
FIG. 6 is a plan view of an exemplary vehicle provided with a closure.

Referring to FIG. 6, a plan view of a vehicle 152 provided with a closure 154 and a closure assembly 156 is provided. One or more of the components may include non-planar regions to facilitate a more uniform coating thickness as previously described above.

Figure 7:
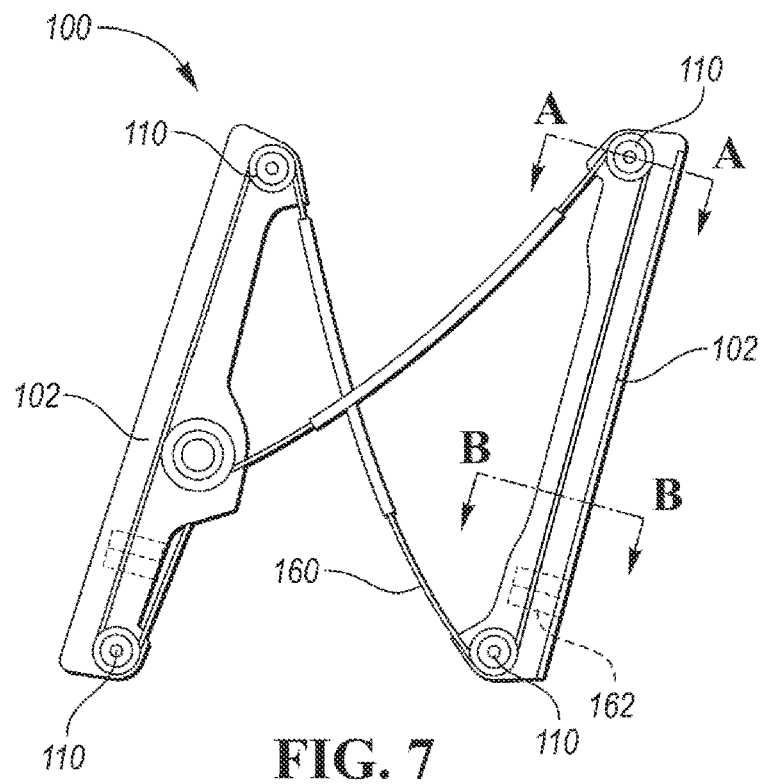
FIG. 7 is a plan view of an exemplary window regulator.

Referring to FIG. 7 a plan view of an exemplary window regulator assembly 100 is provided. The window regulator may include a pair of guide rails 102. Each of the guide rails may include a number of pulleys 110 that engage a cable 160. A slider 162, configured to hold or support a pane of glass (not illustrated) may be attached to the cable 160 so that as the cable 160 is pulled, the slider 162 may move e.g., translate along the guide rail 102 to move the window.

Figure 9A:
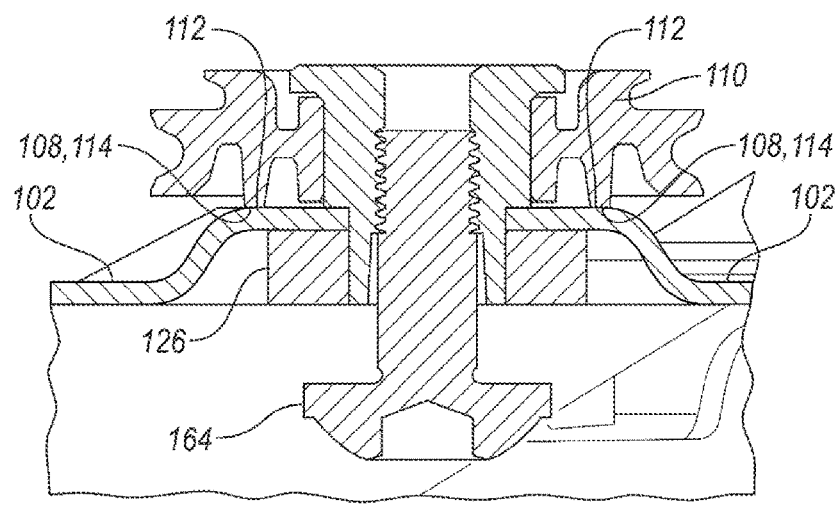
FIG. 9A is a partial-cross-sectional view of a portion of an exemplary window regulator assembly taken along the lines A-A in FIG. 7.

Referring to FIG. 9A, a cross-sectional view taken along lines A-A in FIG. 7 is illustrated. As mentioned above, the window regulator assembly 100 includes a guide rail 102 and a pulley 110. The pulley 110 may be rotatably fixed to the guide rail 102 by a bolt 164 and the nut 126. The offset surface 106 of the guide rail 102 may include a bearing-surface region 108 that may engage a mating-bearing-surface region 166 formed by the pulley 110.

Figure 9B:
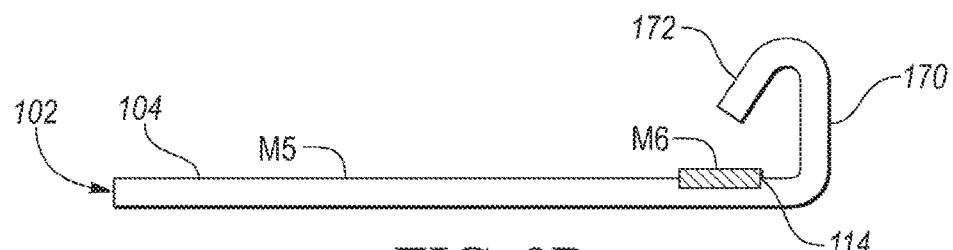
FIG. 9B is a partial-cross-sectional view of a portion of an exemplary window regulator assembly taken along the lines B-B in FIG. 7.

Referring to FIG. 9B, a cross-sectional view taken along lines B-B in FIG. 7 is illustrated. The cross-sectional view illustrates a guide rail 102 that includes a flange 170 that may extend from a main portion 104 of the guide rail 102. The flange 170 may include a lip 172 that may curl back towards the main portion 104 of the guide rail 102. The lip 172 may be configured to engage the slider 162 (FIG. 7). The lip 172 may at least partially cover a bearing-surface region 108 that may engage a mating-bearing-surface region defined by the slider 162. Non-planar regions 114 may be formed in the bearing-surface region 108. The non-planar regions 114 may be formed by apertures, grooves, or serrations as previously described above.

Figure 8:
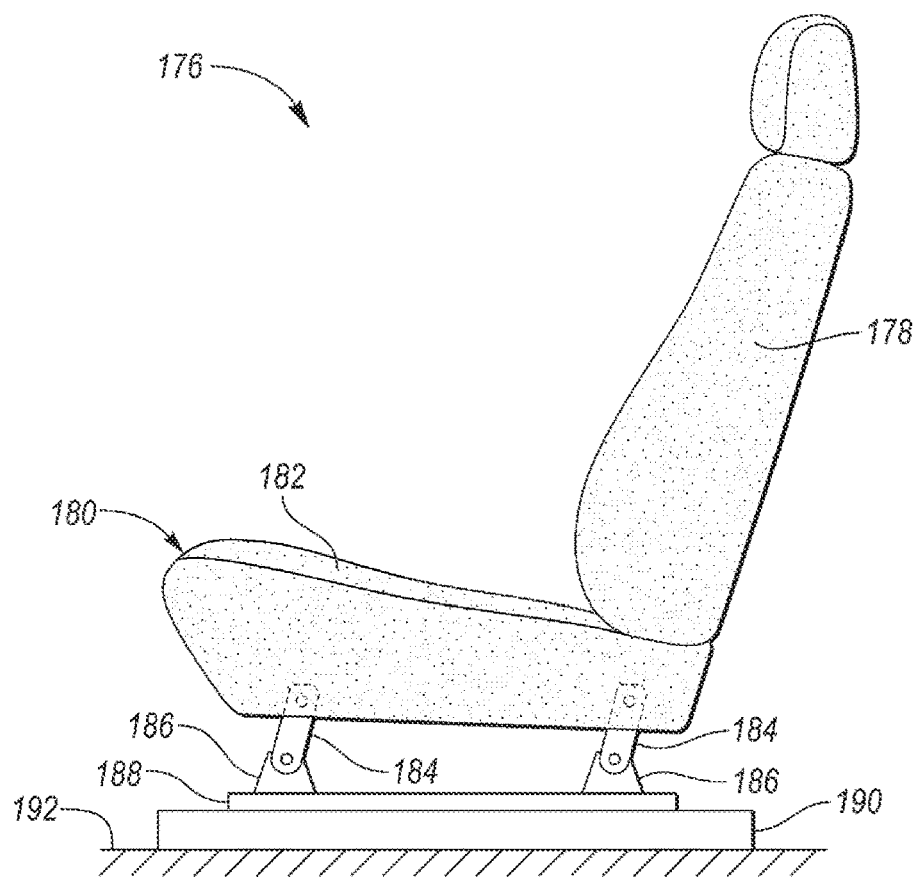
FIG. 8 is a perspective view of an exemplary seat assembly.

Referring to FIG. 8, a plan view of an exemplary vehicle seat 176 is provided. The vehicle seat 176 may include a backrest 178 that may be attached e.g. directly or indirectly to a seat base 180. The seat base may include a cushion frame 182 and link arms 184 that may be pivotally attached to the frame 182 and to upper rail brackets 186. The upper rail brackets 186 may be fixed to an upper rail 188 that may be moveably engaged with a lower rail 190. The lower rail 190 may be fixed to a vehicle floor 192. One or more stationary components of the vehicle seat 176, e.g. frame member 182, upper rail brackets 186, lower rail 190, of the vehicle seat 176 may include a bearing-surface region 108. One or more moving components of the vehicle seat 176, e.g., link arms 184, upper rail 188, may include a mating-bearing-surface region 148 that may engage the bearing-surface region 108. The bearing-surface region 108 or the mating-bearing-surface region 148 may include non-planar regions 114 to achieve a desired coating thickness, as previously described above.

Figure 10:
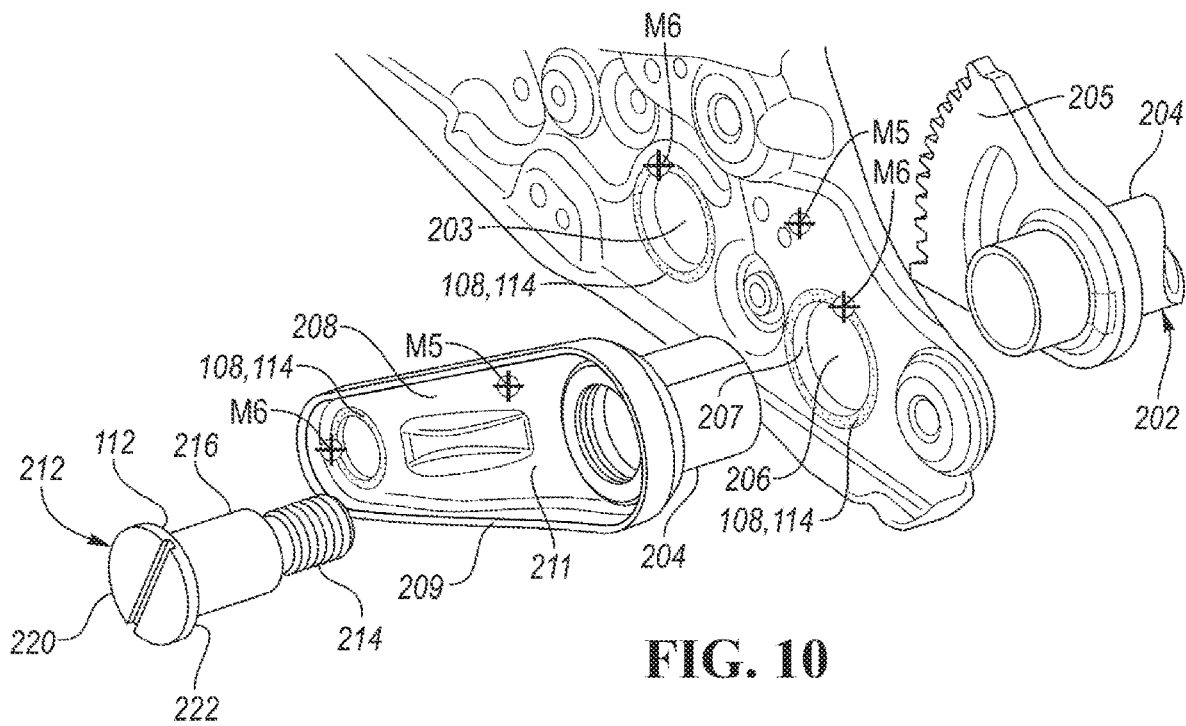
FIG. 10 is a partial-exploded view of a portion of an exemplary seat assembly.

Referring to FIG. 10, partial-exploded view of a portion of the exemplary seat assembly 176, such as the cushion frame member 182 is provided. The cushion frame member 182 may include a side panel 200 and a tube assembly 202. The tube assembly 202 may include one or more tube portions 204 that are configured to engage one another. The side panel may define a tube attachment aperture 206 that may be configured to receive one or more of the tube portions 204. One of the tube portions 204 may include a sector 205 that may engage a pinion of an actuator (not shown).

In one or more embodiments, the tube attachment aperture 206 may include a flange 207 that defines an inner periphery of the tube attachment aperture 206. The flange or a portion of the side panel 200 that is adjacent to the flange may include a bearing-surface region 108 that may engage a mating-bearing-surface region 148. The bearing-surface region 108 may include the non-planar regions 114 to achieve a desired coating thickness, as previously described above.

As one example, the actuator may be attached to the side panel 200 and be configured to raise and lower the cushion frame 182 with respect to the upper rail 188 (FIG. 8). As the actuator moves the cushion frame 182 the tube portions 204 may rotate with respect to the tube attachment aperture 206. A portion of the actuator may extend through an actuator aperture 203 defined by the side panel. A surface surrounding the actuator aperture may include a bearing-surface region 108 that engages a mating-bearing-surface region 148 of the actuator or an intermediary member disposed between the side panel 200 and the actuator. The bearing-surface region 108 may include the non-planar regions to achieve a desired coating thickness, as previously described above.

The tube assembly 202 may also include a rear link arm 208 that may be attached to one or more of the tube portions 204. The rear link arm 208 may include a flange 209 that may extend from a main portion 211 of the rear link arm 208. The flange 209 may define a portion or all of a periphery of the rear link arm 208. The rear link arm 208 may define an aperture 210 that may be configured to receive a fastener, such as a shoulder bolt 212. The shoulder bolt 212 may include a threaded portion 214, that may engage one or more of the upper rail brackets 186 (FIG. 8), a shoulder portion 216, that may engage an inner periphery 218 of the aperture, and a head 220. A bottom surface 222 of the head 220 may include a mating-bearing-surface region 148 that may engage a bearing-surface region 108 of the rear link arm 208. The bearing-surface region 108 may include the non-planar regions to achieve a desired coating thickness, as previously described above.

While a rear link arm is illustrated and described above, another link arm disposed in a number of other positions on the vehicle seat 176 may include the non-planar regions 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior-art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior-art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

5 measurement points
6 measurement points
10 prior-art guide rail
12 main portion
14 pulley mounting portion
15 aperture
16 rib portions
18 edge portions
20 pulley
22 bearing surface
24 grease pockets
100 window regulator assembly
102 guide rail
104 main portion
106 offset surface
107 ribs
108 bearing-surface region
110 pulley
112 mating-bearing-surface region
114 non-planar regions
116 pulley mounting aperture
120 apertures
121 grease pockets
124 groove
126 fastener
140 latch
142 housing
144 catch
146 pawl
152 vehicle
154 closure
156 closure assembly
160 cable
162 slider
164 bolt
170 flange
172 lip
176 exemplary vehicle seat
176 vehicle seat
176 exemplary seat assembly
178 backrest
180 seat base
182 frame
184 link arms
186 upper rail brackets
188 upper rail
190 rail
192 vehicle floor
200 side panel
202 tube assembly
203 actuator aperture
204 tube portions
205 sector
206 tube attachment aperture 207 flange
208 rear link arm
209 flange
210 aperture
211 main portion of link arm
212 shoulder bolt
214 threaded portion
216 shoulder portion
218 inner periphery
220 head
222 bottom surface
M Measurement Areas

What is claimed is:

1. A vehicle mechanism comprising:
a guide rail for use in a window regulator and including a main portion provided with an offset surface region including a bearing-surface region having non-planar regions;
a pulley configured to move with respect to the stationary member and including a mating-bearing-surface region configured to engage the bearing-surface region of the stationary member; and
a coating covering the main portion and the bearing-surface region, wherein the coating on the main portion has a first thickness and the coating on the bearing-surface region has a second thickness, and wherein the second thickness is at least 20% greater than the first thickness.

2. The vehicle mechanism of claim 1, wherein the non-planar regions are formed by a plurality of apertures defined by the stationary member and disposed in the bearing-surface region.

3. The vehicle mechanism of claim 2, wherein the bearing-surface region is annular in shape.

4. The vehicle mechanism of claim 3, wherein the plurality of apertures are arranged concentrically with respect to the bearing-surface region.

5. The vehicle mechanism of claim 1, wherein the non-planar regions are formed by a plurality of depressions defined by the stationary member and disposed in the bearing-surface region.

6. The vehicle of claim 5, wherein the bearing-surface region is circular and at least one of the depressions is elongated and extends in a radial direction with respect to the bearing-surface region.

7. A vehicle mechanism comprising:
a stationary member including a main portion, a flange extending from the main portion, and a bearing-surface region disposed adjacent to the flange and having non-planar regions formed by a plurality of grooves defined by the stationary member and disposed in the bearing-surface region, wherein a first groove of the plurality of grooves has a first depth and a second groove of the plurality of grooves has a second depth, less than the first depth;
a moveable member configured to move with respect to the stationary member and including a mating-bearing-surface region configured to engage the bearing-surface region of the stationary member; and
a coating covering the main portion and the bearing-surface region, wherein the coating on the main portion has a first thickness and the coating on the bearing-surface region has a second thickness, and wherein the second thickness is at least 20% greater than the first thickness.

8. The vehicle mechanism of claim 7, wherein the flange includes a lip wherein the lip is curled towards the main portion and wherein the lip covers a portion of the bearing-surface region.

9. The vehicle mechanism of claim 7, wherein the stationary member is a guide rail for use in a window regulator and the moveable member is a slider configured to support a window pane and translate along the bearing-surface region.

10. The vehicle mechanism of claim 7, wherein the stationary member is a side panel for use in a vehicle seat assembly and wherein the moveable member is a link arm configured to rotate about the side panel.

11. The vehicle mechanism of claim 7, wherein the stationary member is a side panel for use in a vehicle seat assembly and the flange is formed by an inner periphery of an aperture defined by the side panel, and wherein the moveable member is configured to rotate within the aperture.

12. The vehicle mechanism of claim 11, wherein the moveable member is a tube assembly.

13. A vehicle mechanism comprising:
a fastener for use with a vehicle seat and including a bearing-surface region;
a link arm configured to rotate about the fastener to move a portion of the vehicle seat, the link arm including a main portion provided with a mating-bearing-surface region configured to engage the bearing-surface region, wherein the mating-bearing-surface region includes non-planar regions; and
a coating covering the moveable member, wherein the coating on the main portion has a first thickness and the coating on the bearing-surface region has a second thickness, and wherein the second thickness is at least 20% greater than the first thickness.

14. The vehicle mechanism of claim 13, wherein the non-planar regions are formed by a plurality of serrations.

* * * * *